3,403,184
CAROTENOID COMPOUNDS
Albert J. Chechak and Charles D. Robeson, Rochester, N.Y., assignors to Eastman Kodak Company, Rochester, N.Y., a corporation of New Jersey
No Drawing. Filed Mar. 23, 1966, Ser. No. 536,653
2 Claims. (Cl. 260—612)

ABSTRACT OF THE DISCLOSURE

Novel carotenoid compounds, useful as food colorants and as additives in poultry feed, having the structural formula:

$$R—A_m—A_n'—R'$$

where R is 2,6,6-trimethylcyohex-1-enyl, A is 3-methyl-1,3-butadienyl, A' is 2-methyl-1,3-butadienyl, R' is 2,6,6-trimethylcyclohex-1-enyl or 2,6,6-trimethylcyclohex-1,3-dienyl or p-methoxyphenyl, m is 1 to 3, n is 1 to 3, and the sum of m plus n is 2 to 4.

---

This invention resides in the chemical arts. More particularly it relates to that part of organic chemistry having to do with carotenoid compounds.

Carotenoid compounds are organic compounds of aliphatic molecular structure and of aliphatic-alicyclic molecular structure which structures contain partly dehydrogenated isoprene groups (from 3 or 4 to 8 or more). These groups are present in a chain in such a way that the alternate single and double bonds (conjugated double bonds) form a chromophoric system.

In the feeding of poultry, particularly chickens, there is a need for materials which, when ingested by poultry, cause the skin and fat to acquire a yellow tint that is desired by certain ethnic groups, and produce a coloration in the yolks of eggs laid by such poultry, which coloration is desired by manuacturers of cake mixes, egg noodles and the like. Many commercial poultry feeds such as, for example, those based on milo as a substitute for corn, while otherwise quite adequate for poultry nutrition, are deficient in such materials.

A number of naturally occurring and known synthetic carotenoid compounds are poultry colorants or pigmenters. Representative of these compounds are lutein, zeaxanthin, canthaxanthin, physalien, helenien and β-apocarotenoic acid methyl ester.

On the other hand a number of known carotenoid compounds are not deposited in poultry skin and fat and in poultry eggs to any appreciable extent. Representative of these compounds are the carotenes such as β-carotene, ε-carotene, bis-dehydro-β-carotene, and the like.

An object of this invention is to provide new carotenoid compounds which are poultry colorants or pigments.

There is also a need for edible food colorants suitable for coloring margarine, butter, cheese, fruit juice, soft drinks, candy and other foods.

Another object of this invention is to provide new carotenoid compounds which are useful as food colorants.

These and other objects as may appear hereinafter are achieved by this invention.

In summary, this invention comprises a group of new carotenoid compounds. The compounds of this group are represented by the generic formula:

$$R—A_m—A_n'—R'$$

wherein R is the univalent 2,6,6-trimethylcyclohex-1-enyl radical, A is the divalent 3-methyl-1,3-butadienyl radical

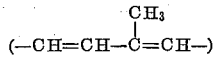

A' is the divalent 2-methyl-1,3-butadienyl radical

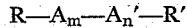

R' is a univalent radical selected from the group consisting of the 2,6,6-trimethylcyclohex-1-enyl radical, the 2,6,6-trimethylcyclohex-1,3-dienyl radical and the p-methoxyphenyl radical, m is 1–3 and n is 1–3 with the sum of m and n being 2–4.

Examples of compounds according to this generic formula include:

1,16-bis(2,6,6-trimethylcyclohex-1-enyl)-3,7,10,14-tetramethylhexadec-1,3,5,7,9,11,13,15-octaene 1-(2,6,6-trimethylcyclohex-1-enyl)-16-(2,6,6-trimethylcyclohex-1,3-dienyl)-3,7,10,14-tetramethylhexadec-1,3,5,7,9,11,13,15-octaene 1-(2,6,6-trimethylcyclohex-1-enyl)-16-(p-methoxyphenyl)-3,7,11,14-tetramethylhexadec-1,3,5,7,9,11,13,15-octaene The compounds of this invention, when added to chicken feed free of skin and egg yolk pigmenters cause the skin and fat of chickens ingesting the feed to have a yellowish tint and the yolks of their eggs to become yellow. In addition, the compounds of this invention are useful as food colorants.

The compounds of this invention generally are synthesized by coupling together by the Wittig reaction appropriate intermediates which are either commercially available or made by known reactions and procedures from commercially available chemicals.

This invention is further illustrated by the following working examples of various aspects of this invention, including preferred specific embodiments thereof. This invention is not limited to these specific embodiments unless otherwise indicated.

EXAMPLE 1

This example illustrates a specific embodiment of a process for the synthesis of 1,16-bis(2,6,6-trimethylcyclohex - 1 - enyl)-3,7,10,14-tetramethylhexadec-1,3,5,7,9,11, 13,15-octaene.

1.8 grams of potassium borohydride in a mixture of 50 milliliters of isopropyl ether and 150 milliliters of 10% aqueous methanol are admixed with 13.1 grams of 8-(2,6, 6 - trimethylcyclohex - 1 - enyl)-6-methylocta-3,5,7-trien-2-one. 100 milliliters of isopropyl ether are added to the mixture which is then washed with water and dried over sodium sulfate. The isopropyl ether is removed by evaporation, leaving a product consisting essentially of 8-(2,6,6-trimethylcyclohex - 1 - enyl)-6-methylocta 3,5,7-trien-2-ol ($C_{18}$ alcohol). A typical quantity of $C_{18}$ alcohol product obtained under these conditions is 13.75 grams. A typical light absorption value for the product is E (1%, 1 cm., cyclohexane) (287 mμ)=777.

4.1 grams of the $C_{18}$ alcohol product are dissolved in 6 milliliters of methanol and 4.1 grams of triphenylphosphine are admixed therewith. The resulting solution is cooled to 0° C. 5.36 milliliters of 2.92 Normal methanolic hydrogen chloride are admixed with the solution. The then acidified solution is stirred at 0° C. for one hour, allowed to stand for 18 hours at 20–25° C., and then cooled to —20° C. 4.4 grams of retinal in 10 milliliters of methanol and 13 milliliters of 2.4 normal methanolic potassium hydroxide are simultaneously admixed with the acidified solution with vigorous stirring under nitrogen. The resulting reaction mixture is stirred for three hours at 0° C. and then for about 18 hours at 25° C. During this time red solids form. They are collected by filtration, washed thoroughly with methanol, water and methanol, and dried. They are then dissolved in warm benzene and the resulting solution cooled whereby a crystalline product is formed. The product, separated from the benzene is the desired product. It consists essentially of 1,16-bis(2,6,6-trimethylcyclohex - 1 - enyl) - 3,7,10,14-tetramethylhexadec-1,3,5,7,9,11,13,15-octaene. A typical quantity of the desired product obtained under these conditions is 2.4 grams. A typical light absorption value of the product is E (1%, 1 cm., cyclohexane) (438 m$\mu$) =2280.

EXAMPLE 2

This example illustrates a specific embodiment of a process for the synthesis of 1-(2,6,6-trimethylcyclohex-1-enyl) - 16 - (2,6,6-trimethylcyclohex-1,3-dienyl)-3,7,10,14-tetramethylhexadec-1,3,5,7,9,11,13,15-octaene.

3.6 grams of the $C_{18}$ alcohol product of Example 1 are dissolved in 9 milliliters of methanol. 3.54 grams of triphenylphosphine are admixed with the solution. The resulting mixture is cooled to 5° C. 4.5 milliliters of 2.9 normal methanolic hydrogen chloride are added and the acidified mixture is allowed to stand under nitrogen for 18 hours at 5° C. Thereafter, the acidified mixture and 0.87 gram of potassium hydroxide in 10 milliliters of methanol are simultaneously admixed with 6.06 grams of dehydroretinal in 13 milliliters of methanol at −10° C. The resulting reaction mixture is stirred at 0° C. for 3 hours and then at 20–25° C. for 18 hours. The red solids, which have formed, are collected by filtration washed successively with methanol, warm water and methanol, and then dried. The solids are then dissolved in warm benzene and the desired product crystallized therefrom by cooling. The desired product, separated from the benzene consists essentially of 1-(2,6,6-trimethylcyclohex-1-enyl) - 16 - (2,6,6, - trimethylcyclohex-1,3-dienyl)-3,7,10,14 - tetramethylhexadec - 1,3,5,7,9,11,13,15-octaene. The product, generally in the form of orange flakes, typically has a light absorption value of E (1%, 1 cm., cyclohexane) (453 m$\mu$) =1960.

EXAMPLE 3

This example illustrates a specific embodiment of a process for the synthesis of 1-(2,6,6-trimethylcyclohex-1-enyl) - 16 - (p-methoxyphenyl) - 3,7,11,14 - tetramethylhexadec-1,3,5,7,9,11,13,15-octaene. Typical quantities and light absorption values of materials involved are given parenthetically.

5-(p-methoxyphenyl)-3-methylpenta-2,4-dienoic acid is made from anisaldehyde by the process of Cawley and Nelan [JACS 77, 4130, (1955)]. A typical light absorption value for this material is E (1%, 1 cm., cyclohexane) (329 m$\mu$) =1220.

The acid (79 grams) is esterfied by refluxing with methanol (50 milliliters) in 2-butanone (500 milliliters) in the presence of anhydrous potassium carbonate (60 grams) for 1.5 hours. After diluting the reaction mixture with ether and water, the layers are separated and the ether layer washed with water. After drying the ether layer over sodium sulfate, it is filtered and the solvent distilled off to yield a solid residue consisting essentially of the methyl ester (72.5 grams). Crystallization of the residue from methanol (250 milliliters) gives crystals (60 grams) [E (1%, 1 cm., cyclohexane) (333 m$\mu$) =1231] of the methyl ester.

A portion (66 grams) of the ester in anhydrous ethyl ether (950 milliliters) is cooled to −5° C. and an ether solution of lithium aluminum hydride (410 milliliters of 0.76 molar solution) is added over a period of 12 minutes. The reaction mixture is carefully hydrolyzed with cold dilute hydrochloric acid and the ether layer washed repeatedly with saturated sodium bicarbonate solution and water. After drying over anhydrous sodium sulfate, the ether solution is evaporated, leaving a solid residue (57 grams) of 5-(p-methoxyphenyl)-3-methylpenta-2,4-dien-1-ol. [E (1%, 1 cm., cyclohexane) (294 m$\mu$) =1402].

To a cold (−10° C.) solution of 5-(p-methoxyphenyl)-3-methylpenta-2,4-dien-1-ol (23 grams) in acetone (350 milliliters) is added portionwise with swirling manganese dioxide (350 grams). The resulting slurry is allowed to stand at room temperature for 18 hours. The reaction mixture thus obtained is filtered and the filter cake washed thoroughly with anhydrous diethyl ether. The filtrate and ether washings are combined and the solvent evaporated under nitrogen, leaving a pale yellow solid (22.4 grams) [E (1%, 1 cm., cyclohexane) (346 m$\mu$) =843]. Crystallization from methanol-petroleum ether (B.P. 35–65° C.) (200 milliliters, 1:1) at −20° C. gives crystalline (p-methoxyphenyl)-3-methylpenta-2,4-dien-1-al (9.75 grams) [E (1%, 1 cm., cyclohexane) (347 m$\mu$) =1420].

To a cooled (−20° C.) solution of retinal (32.2 grams) in acetone (100 milliliters) is added a cold solution of potassium hydroxide (10 grams) in methanol (100 milliliters). The reaction mixture is stored at room temperature for 1 hour and the deep red solution then diluted with ether and washed with water until washings were neutral. After drying the ether solution over anhydrous sodium sulfate, the solvent is evaporated, and the residue dissolved in petroleum ether (Skellysolve F, 200 milliliters) and cooled to −20° overnight and filtered. Because filtration yields only a small crop (5.6 grams) of crystals, the filtrate is chromatographed on a column of sodium aluminum silicate (Doucil, 612 grams). The non-adsorbed fractions and the ether eluate of the bottom half of the column are combined and evaporated to give a red oil (29.5 grams). [E (1%, 1 cm., cyclohexane) (403 m$\mu$) =1130]. The oil is dissolved in petroleum ether (B.P. 35–65° C.) (280 milliliters) and allowed to crystallize at −20° C. for four days. The solids are collected and combined with the solids separated by filtration before chromatography. These solids (17.6 grams) [E (1%, 1 cm., cyclohexane) (403 m$\mu$) =1450] consist essentially of 6,10-dimethyl-12-(2,6,6-trimethylcyclohex-1-enyl)-dodeca-3,5,7,9,11-pentaene-2-one ($C_{23}$ ketone).

A quantity (16.1 grams, 0.05 mole) of the $C_{23}$ ketone is dissolved in ether (125 milliliters) in a red flask. Potassium borohydride (1.33 grams, 0.025 mole) and methanol (250 milliliters) are added to the ketone and the flask is capped with a condenser protected by a drying tube. The solution is stirred magnetically for 4 hours. Diethyl ether (100 milliliters) is then added and the solution washed with dilute acid and finally with water. The ether solution is then dried over sodium sulfate, filtered, and the ether evaporated off under vacuum. The residue (16 grams) consists essentially of 6,10-dimethyl-12-(2,6,6-trimethylcyclohex - 1 - enyl)-dodeca-3,5,7,9,11-pentaene-2-ol. [E (1%, 1 cm.) (357 m$\mu$) =1450]. It is a $C_{23}$ alcohol.

A quantity (2.31 grams, 0.0073) of the $C_{23}$ alcohol and triphenylphosphine (1.91 grams, 0.0073 mole) are dissolved in methanol (3 milliliters) in a 50 milliliter 3-necked, pear shaped flask equipped with a stirrer and a dropping funnel protected by a drying tube. The flask is flushed with nitrogen and cooled to 0–5° C. with an ice bath. Methanolic hydrochloric acid (2.18 milliliters of 3.4 N acid) is then added dropwise with stirring. The solution is then stirred for 2 hours at 0–5° C. The clear solution containing phosphonium salt, is transferred to a dropping funnel equipped with a drying tube.

5-(p-methoxyphenyl)-3 - methylpenta-2,4-dienal (1.53 grams 0.0076 mole) is dissolved in methanol (3 milliliters) in a 50 milliliters 3-necked, pear shaped flask equipped with a stirrer, the dropping funnel containing the phosphonium salt, and another dropping funnel also protected by a drying tube and containing methanolic potassium hydroxide (3.75 milliliters of 2 N base). The flask is chilled to −20° C. and stirred while the contents of the dropping funnels are added simultaneously over 20 minutes. The mixture is then warmed to 0–5° C., and stirred for 2 hours. After standing at 6° C. for 72 hours the mixture is filtered and the semisolid product washed with methanol. This material is chromatographed on 80 grams of Doucil adsorbent using petroleum ether (B.P. 35–65° C.) solvent to develop and elute the product. The initial orange band is eluted and evaporated to dryness. The residue is recrystallized once from chloroform-methanol giving a product (0.17 grams) (M.P.

141–144° C.) [E (1%, 1 cm., cyclohexane) (447 mμ)=2060] consisting essentially of 1-(2,6,6-trimethyl-cyclohex-1-enyl-16-(p-methoxyphenyl)-3,7,11,14 - tetramethylhexadec-1,3,5,7,9,11,13,15-octaene.

Samples of the carotenoid compounds of Examples 1 to 3 were actually fed for seven days to 3 week old Hallcross White Leghorn cockerels which had been kept on a pigment-low diet from birth and which were depleted of skin pigments at the time these carotenoid compounds were introduced into the diet. At the end of the seven days the shank skin pigmentation was assessed visually by a panel of four people. In the case of each compound the panel found that the carotenoid compound had been deposited in the shank skin and that the color was yellow.

A sample of the carotenoid compound of Example 2 was also actually fed to Hallcross White Leghorn laying hens previously sustained on the same pigment-low diet as the cockerels. After approximately one week of feeding, the yolks of these eggs were examined and were found to have a yellowish color not present in the yolks of eggs laid prior to feeding of the carotenoid product to the hens.

Hence, this invention provides carotenoid compounds which cause pigmentation to develop in poultry and poultry egg yolks.

Other features, advantages and specific embodiments of this invention will be readily apparent to those in the exercise of ordinary skill in the art after reading the foregoing disclosures. In this regard while specific embodiments of processes for synthesizing the compounds of this invention have been described in considerable detail, variations and modifications of these embodiments can be effected without departing from the spirit and scope of the invention as disclosed and claimed.

We claim:
1. A compound according to the formula:

$$R-A_m-A_n'-R'$$

wherein R is the 2,6,6-trimethylcyclohex-1-enyl radical, A is the divalent 3-methyl-1- 3-butadienyl radical, A' is the divalent 2-methyl-1, 3-butadienyl radical, R' is the p-methoxyphenyl radical, $m$ is 1–3 and $n$ is 1–3 with the sum of $m$ and $n$ being 2–4.

2. 1-(2,6,6-trimethylcyclohex - 1-enyl)-16-(p-methoxyphenyl)-3,7,11,14 - tetramethylhexadec - 1,3,5,7,9,11,13,15-octaene.

References Cited

UNITED STATES PATENTS

| 2,849,495 | 8/1958 | Isler et al. | 260—666 XR |
| 2,871,267 | 1/1959 | Petracek et al. | 260—611 XR |
| 3,033,897 | 5/1962 | Robeson | 260—611 XR |

FOREIGN PATENTS 936,336    9/1963    Great Britain.

BERNARD HELFIN, *Primary Examiner.*